(12) United States Patent
Weber (10) Patent No.: US 8,161,677 B1
(45) Date of Patent: Apr. 24, 2012

(54) TRIP-UP SIGNAL DEVICE FOR A ROD AND REEL

(76) Inventor: Michael W. Weber, Birchwood, WI (US)

( * ) Notice: Subject to any disclaimer, the term of this patent is extended or adjusted under 35 U.S.C. 154(b) by 416 days.

(21) Appl. No.: 12/380,078

(22) Filed: Feb. 24, 2009

(51) Int. Cl.
*A01K 97/12* (2006.01)
(52) U.S. Cl. ............................................................ 43/17
(58) Field of Classification Search ................ 43/17, 15, 43/16
See application file for complete search history.

(56) References Cited

U.S. PATENT DOCUMENTS

| | | | | |
|---|---|---|---|---|
| 75,075 A | | 3/1868 | Talbot | |
| 446,596 A | | 2/1891 | Hackett | |
| 962,309 A | * | 6/1910 | Butler | 43/17 |
| 962,420 A | * | 6/1910 | Dibbles | 43/17 |
| 1,995,067 A | | 3/1935 | Killory | |
| 2,136,864 A | * | 11/1938 | Paquette | 43/17 |
| 2,496,090 A | * | 1/1950 | Grohs | 43/17 |
| 2,732,649 A | * | 1/1956 | Tuttle | 43/17 |
| 2,752,716 A | * | 7/1956 | Porter | 43/16 |
| 2,773,326 A | * | 12/1956 | Calvert | 43/16 |
| 2,869,275 A | | 1/1959 | Levin | |
| 2,931,122 A | * | 4/1960 | Thordson et al. | 43/17 |
| 3,057,105 A | * | 10/1962 | Moses | 43/16 |
| 3,143,822 A | * | 8/1964 | Schooley | 43/17 |
| 3,187,456 A | * | 6/1965 | Apitz | 43/17 |
| 3,199,241 A | * | 8/1965 | Mauritz | 43/17 |
| 3,221,705 A | * | 12/1965 | Saviskas | 43/17 |
| 3,371,443 A | * | 3/1968 | Dobson | 43/17 |
| 3,646,698 A | * | 3/1972 | Zachae | 43/17 |
| 3,727,342 A | * | 4/1973 | Lindsey, Jr. | 43/17 |
| 3,962,812 A | * | 6/1976 | Means et al. | 43/17 |
| 4,146,988 A | * | 4/1979 | Bednarczyk | 43/17 |
| 4,573,281 A | * | 3/1986 | Moisan | 43/17 |
| 5,005,310 A | * | 4/1991 | Rinehart | 43/17 |
| 5,044,108 A | * | 9/1991 | Rinehart | 43/17 |
| 5,068,995 A | * | 12/1991 | Rinehart | 43/17 |
| 5,235,773 A | * | 8/1993 | Rinehart | 43/17 |
| 5,269,088 A | | 12/1993 | Slaback, Jr. et al. | |
| 5,832,652 A | * | 11/1998 | Bartys | 43/17 |
| 5,855,542 A | * | 1/1999 | Wilks | 43/15 |
| 5,881,488 A | | 3/1999 | Canepa | |
| 5,970,645 A | * | 10/1999 | Thill | 43/17 |
| 6,308,452 B1 | * | 10/2001 | Fox | 43/17 |
| 2005/0204606 A1 | * | 9/2005 | Phillips | 43/17 |

FOREIGN PATENT DOCUMENTS

DE 3824381 A1 * 1/1990

(Continued)

*Primary Examiner* — Darren W Ark
(74) *Attorney, Agent, or Firm* — Tipton L. Randall (57) ABSTRACT

A bite-signaling device comprises a clamp member securing the device to the rod of the rod and reel combination. A linear support member is pivotally connected at a first end to the clamp member. The second end of the linear support member includes a perpendicular section with a linear signal member rotatably attached thereto. The linear signal member includes a weighted first end and a signaling second end. A line attachment member is secured to the signaling second end of the linear signal member and releasably secures a fishing line attached to a reel of the rod and reel combination. The fishing line secured to the line attachment member maintains the weighted first end of the signal member elevated relative to the signaling second end thereof. Releasing the fishing line from the line attachment member causes the weighted first end to rotatably descend and elevate the signaling second end of the signal member.

3 Claims, 6 Drawing Sheets

FOREIGN PATENT DOCUMENTS

| | | | | |
|---|---|---|---|---|
| DE | 3910999 | A1 * | 10/1990 |
| EP | 325444 | A1 * | 7/1989 |
| EP | 422913 | A1 * | 4/1991 |
| EP | 602879 | A1 * | 6/1994 |
| EP | 682864 | A1 * | 11/1995 |
| EP | 1040755 | A1 * | 10/2000 |
| EP | 1346636 | A1 * | 9/2003 |
| EP | 2223592 | A1 * | 9/2010 |
| FR | 2736799 | A1 * | 1/1997 |
| FR | 2738714 | A1 * | 3/1997 |
| GB | 2143711 | A * | 2/1985 |
| GB | 2221131 | A * | 1/1990 |
| GB | 2232863 | A * | 1/1991 |
| GB | 2237169 | A * | 5/1991 |
| GB | 2260676 | A * | 4/1993 |
| GB | 2303528 | A * | 2/1997 |
| GB | 2304512 | A * | 3/1997 |
| GB | 2307161 | A * | 5/1997 |
| GB | 2319157 | A * | 5/1998 |
| GB | 2324452 | A * | 10/1998 |
| JP | 10234282 | A * | 9/1998 |

\* cited by examiner

TRIP-UP SIGNAL DEVICE FOR A ROD AND REEL

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to fishing and, more particularly, to a bite-signaling device for attachment to a rod and reel combination and, most particularly, to a bite-signaling device that does not interfere with operation of the rod and reel combination when reeling in a hooked fish.

2. Background Information

Examples of patents concerned with various devices that attach to a rod and reel combination and function to signal a fish biting the bait include the following.

Talbot, in U.S. Pat. No. 75,075, describes a flag-staff attached to a pole with a flag at one end and a weight at the other. The weight is held at an elevated position by a spring (i), and the fishing line is looped around the staff adjacent the weight. When a fish bites, the flag-staff is dislodged from the spring and the weight falls, raising the flag to indicate a bite.

In U.S. Pat. No. 446,596, Hackett discloses a tilt-up for fishing. The device includes a weight at one end and a flag at the other end of a spring wire. The spring is pivotally mounted to the pole or stake, and the weighted end is engaged with a spool holding the line. When the fish moves the spool, the weighted end of the spring disengages and flips over the end of the pole or stake to raise the flag at the opposite end.

Killory, in U.S. Pat. No. 1,995,067, describes a tip-up flag that has a spring shaft attached to a vertical stake. The line from a reel is engaged with a catch attached to the stake. When a fish pulls on the line, the catch disengages the end of the spring shaft to raise the flag.

In U.S. Pat. No. 2,869,275, Levin discloses an electronic fishing line signal device. The device clips to the pole, and the line rungs through the device, which activates a light or buzzer to indicate a bite.

Thordson et al., in U.S. Pat. No. 2,931,122, describe a spring shaft flag that clips to the end of a fishing pole. The end of the shaft is inserted into the eye at the tip of the pole with the line engaging the end of the shaft. When the line moves, the end of the shaft is disengaged from the eye and the flag springs upwardly.

In U.S. Pat. No. 3,057,105, Moses discloses another spring shaft flag that clips to the end of a fishing pole. The shaft has a loop at the end that the fishing line passes through. The loop attached to a hoop on the clip. When a fish bites, the loop disengages from the hook and the shaft springs upwardly.

Schooley, in U.S. Pat. No. 3,143,822, describes an add-on spring with an eye that attaches to the end of a fishing pole. The line passes through the eye, and the spring is very sensitive to movement of the line through the eye.

In U.S. Pat. No. 3,187,456, Apitz discloses a tip-up, with a flag shaft with a sliding weight on a wire running the length of the shaft. The line is attached to the end of the shaft, with the shaft in a horizontal position and the weight opposite the point of attachment of the line. Movement of the shaft away from vertical causes the weight to slide to the opposite end and signal a bite.

Mauritz, in U.S. Pat. No. 3,199,241, describes a bite indicator that is attached to the end of a fishing rod. The fishing line is engaged with a wire holding a spring-mounted flag. When the wire disengages the spring-mount flag, the flag flips up to indicate a bite.

In U.S. Pat. No. 3,646,698, Zachae discloses a device which can be mounted on a stake embedded in the ground or mounted in the oarlock holder on a rowboat. The device comprises a slidable member, which serves to retain the signaling device in a spring tension position. The slidable member also holds the line from the end of the rod to the hook in confinement. When the fish pulls on the hook and line, the slidable member releases the line and this releases the spring tension device, which springs upwardly to provide the necessary signal.

Lindsey, Jr., in U.S. Pat. No. 3,727,342, describes an ice fishing tip-up apparatus where the fishing line is suspended from a forward position of an elongate pivotal lever. The lever at its fulcrum medial portion is pivotally attached at a fixed location to an upright member. The lever forward-arm is provided with a loosely surrounded slidable weight, having a rearward limit of travel at which the lever is caused to assume a first-stable or "ready" condition. The slidable weight moves along the lever forward-arm during downward tugs on the fishing line, where upon the lever assumes a second-stable or "tipped" condition. The lever can be readily returned by the operator to the first-stable condition. The apparatus can be made to be of variable sensitivity and can be structurally made to an exceedingly compact form for interim storage purposes.

In U.S. Pat. No. 4,146,988, Bednarczyk discloses a fishing rod tip-up or strike indicator, which is removably attached to a fishing rod for indicating a strike and releasing the fishing line, permitting it to run free. The tip-up has a clamp for removably attaching it to the fishing pole and has a partially rotating flag wire assembly supported by a pivot pin. As a fish strikes the bait, pulling on the fishing line, it causes the flag wire assembly to tilt to an upright strike indicating position. In this vertical position the fishing line will slip away from the holder allowing the line to run free. A sliding weight is positioned on the wire holding the flag to assist in movement to an upright position.

Slaback, Jr. et al., in U.S. Pat. No. 5,269,088, describe a fishing rod and spinning reel holding device equipped to signal a fisherman of a striking fish. The signaling mechanism has an axially mounted crank shaft, which directly contacts onto a fishing line on one side of the crank shaft. The other side of the crank shaft is fitted with a hooked retainer for retaining a flagging unit, such as a spring flag staff, in a non-signaling position. When a striking fish tugs upon the fishing line, the fishing line forces the crank shaft to pivotally move about its axial mount and cause the hooked retainer to release the flagging unit to a flagging position and, thus, give the signal of the striking fish.

In U.S. Pat. No. 5,832,652, Bartys discloses a clip-on tip-up apparatus for fishing that includes a springy signal arm secured at its lower end to a releasable mounting clamp for attachment to a fishing rod in any of a number of locations. The signal arm carries a brightly colored flag near its upper free end, along with a spring clip line clamp. The clamp enables the signal arm to be attached directly to a slackened fish line with sufficient force to retain the fish line releasably between opposed jaws of the line clamp and to hold the signal arm in a bent over set position. The fish line pulls free of the line clamp when a fish strikes the bait at the end of the line, causing the signal arm to snap upright and signal the fisherman that a fish has taken the bait.

Canepa, in U.S. Pat. No. 5,881,488 describes a fish bite detector assembly for attachment to a fishing pole. The assembly includes a battery-powered electrical system to signal a fish bite, activated by a magnetically controlled switch. The switch is normally open when in close proximity to a magnet. A compression clip, operably connected to the magnet, grasps the fishing line forming an integral link between the magnet and the fish hook. A bite or disturbance of the hook causes the magnet to move away from the switch, thus, closing the switch contacts, energizing the electrical system and activating an audible alarm.

In U.S. Pat. No. 5,970,645, Thill discloses a fish bite indicator system that includes a flag post having a flag attached to the post by a removable collar. The post is further attached to an elbow member by a coil. The elbow member is attachable to a pole of a fishing rod. The coil urges the post into a perpendicular orientation with respect to the pole. A retention assembly is provided for holding the post in a parallel orientation when in a set position. The fishing line passes through the retention assembly, such that sufficient pull on the fishing line disengages the retention assembly, such that the post returns to the perpendicular orientation. The fish bite indicating system is also usable without the retention assembly by retaining the post using the handle of a spinning reel. The elbow member is adjustably attachable to the pole using a bolt and nut holding a pair of rubber washers around the pole. A pair of metal washers is positioned around the rubber washers, with one of the metal washers having a bent portion urging one of the rubber washers around the pole, such that the pole is secured between the rubber washers.

Applicant has devised a bite-signaling device that overcomes many of the short comings of the above devices and provides an improvement in the technology of bite-signaling devices

SUMMARY OF THE INVENTION

The invention is directed to a fishing bite-signaling device for attachment to a rod and reel combination. The device includes a linear support member that is fastened to a clamp that is secured to a fishing rod between the handle and the first eye of the rod. The support member extends upwardly and makes a right angle to provide a section perpendicular to the support member. A signal flag and counter weighted shaft is rotatably secured to the perpendicular section of the support member. A nylon plastic line clip is attached to the signal shaft, also. The clip includes a V-shaped slot that decreases in width toward the closed end of the slot. Fishing line is inserted into the slot. The force needed to dislodge the line from the slot of the clip varies according to the distance the line is inserted into the slot. The signal flag shaft is oriented with the counter weight up and the flag down, with the line engaged in the plastic clip. When a fish pulls on the line, it disengages from the clip, and the counter weight pivots the signal flag shaft to raise the flag, thus indicating a bite. The signaling device can be use with spinning rod and reel combinations, as well as level wind rod and reel combinations. It is preferred that the spinning reel bail be open or the level wind reel be free, with the signaling device connected to the line.

In a preferred embodiment of the invention, the bite-signaling device comprises a clamp member adapted for securing the bite-signaling device to the rod of the rod and reel combination. A linear support member, having first and second ends, is pivotally connected at a first end to the clamp member. The second end of the linear support member includes a section perpendicular thereto. A linear signal member is rotatably attached at about a midpoint to the perpendicular section of the linear support member. The linear signal member includes a weighted first end and a signaling second end. A line attachment member is secured to the signaling second end of the linear sugnal member. The line attachment member is adapted for releasably securing a fishing line attached to a reel of the rod and reel combination. The fishing line is secured to the line attachment member and maintains the weighted first end of the signal member elevated relative to the signaling second end thereof. Releasing the fishing line from the line attachment member causes the weighted first end to rotatably descend and elevate the signaling second end of the signal member.

In a most preferred embodiment of the invention, the bite-signaling device comprises a clamp member adapted for securing the bite-signaling device to the rod of the rod and reel combination. A linear support member having first and second ends is pivotally connected at a first end to the clamp member. The second end thereof has a U-shaped section perpendicular to the linear support member. The U-shaped section includes first and second leg portions, with the first leg portion attached at an end to the linear support member and the second leg portion positioned opposite the linear support member, A knob member is operatively connected to the clamp member, with the knob member rotatable to hold the linear support member in a selected orientation relative to the rod of the rod and reel combination. A linear signal member is rotatably attached at about a midpoint to the second leg portion of the U-shaped section of the linear support member. The linear signal member includes a weighted first end and a signaling second end. A line attachment member is secured to the signaling second end of the linear signal member. The line attachment member is adapted for releasably securing a fishing line attached to a reel of the rod and reel combination. The fishing line is secured to the line attachment member and maintains the weighted first end of the signal member elevated relative to the signaling second end thereof. Releasing the fishing line from the line attachment member causes the weighted first end to rotatably descend and elevate the signaling second end of the signal member.

DESCRIPTION OF THE EMBODIMENTS

Nomenclature

| | |
|---|---|
| 10 | Bite-Signaling Device |
| 20 | Clamp Member |
| 22 | Adjustment Knob Member |
| 24 | Threaded Shaft |
| 30 | Linear Support Member |
| 32 | First End of Linear Support Member |
| 34 | Loop of First End |
| 36 | Second End of Linear Support Member |
| 38 | Perpendicular Section of Second End |
| 40 | U-Shaped Perpendicular Section |
| 42 | First Leg Portion |
| 44 | Second Leg Portion |
| 46 | Leg Connecting Portion |
| 50 | Linear Signal Member |
| 52 | Weighted First End of Signal Member |
| 54 | Weight Member |
| 56 | Signaling Second End of Signal Member |
| 58 | Flag Member |
| 60 | Light Member |
| 70 | Line Attachment Member |
| 72 | Swivel Device |
| 74 | Body Section of Attachment Member |
| 76 | Closed-End Slot |
| 78 | Open End of Slot |
| 80 | Closed End of Slot |
| L | Fishing Line |
| R | Rod |
| W | Reel |

Construction

The invention is a bite-signaling device adapted for attachment to the rod of a rod and reel combination. The bite-signaling device comprises a clamp member adapted for securing the bite-signaling device to the rod of the rod and reel combination. A linear support member, having first and second ends, is pivotally connected at a first end to the clamp member. The second end of the linear support member includes a section perpendicular thereto. A linear signal member is rotatably attached at about a midpoint to the perpendicular section of the linear support member. The linear signal member includes a weighted first end and a signaling second end. A line attachment member is secured to the signaling second end of the linear signal member. The line attachment member is adapted for releasably securing a fishing line attached to a reel of the rod and reel combination. The fishing line is secured to the line attachment member and maintains the weighted first end of the signal member elevated relative to the signaling second end thereof. Releasing the fishing line from the line attachment member causes the weighted first end to rotatably descend and elevate the signaling second end of the signal member.

In a most preferred embodiment of the invention, the bite-signaling device comprises a clamp member adapted for securing the bite-signaling device to the rod of the rod and reel combination. A linear support member having first and second ends is pivotally connected at a first end to the clamp member. The second end thereof has a U-shaped section perpendicular to the linear support member. The U-shaped section includes first and second leg portions, with the first leg portion attached at an end to the linear support member and the second leg portion positioned opposite the linear support member, A knob member is operatively connected to the clamp member, with the knob member rotatable to hold the linear support member in a selected orientation relative to the rod of the rod and reel combination. A linear signal member is rotatably attached at about a midpoint to the second leg portion of the U-shaped section of the linear support member. The linear signal member includes a weighted first end and a signaling second end. A line attachment member is secured to the signaling second end of the linear signal member. The line attachment member is adapted for releasably securing a fishing line attached to a reel of the rod and reel combination. The fishing line is secured to the line attachment member and maintains the weighted first end of the signal member elevated relative to the signaling second end thereof. Releasing the fishing line from the line attachment member causes the weighted first end to rotatably descend and elevate the signaling second end of the signal member.

Figure 1:
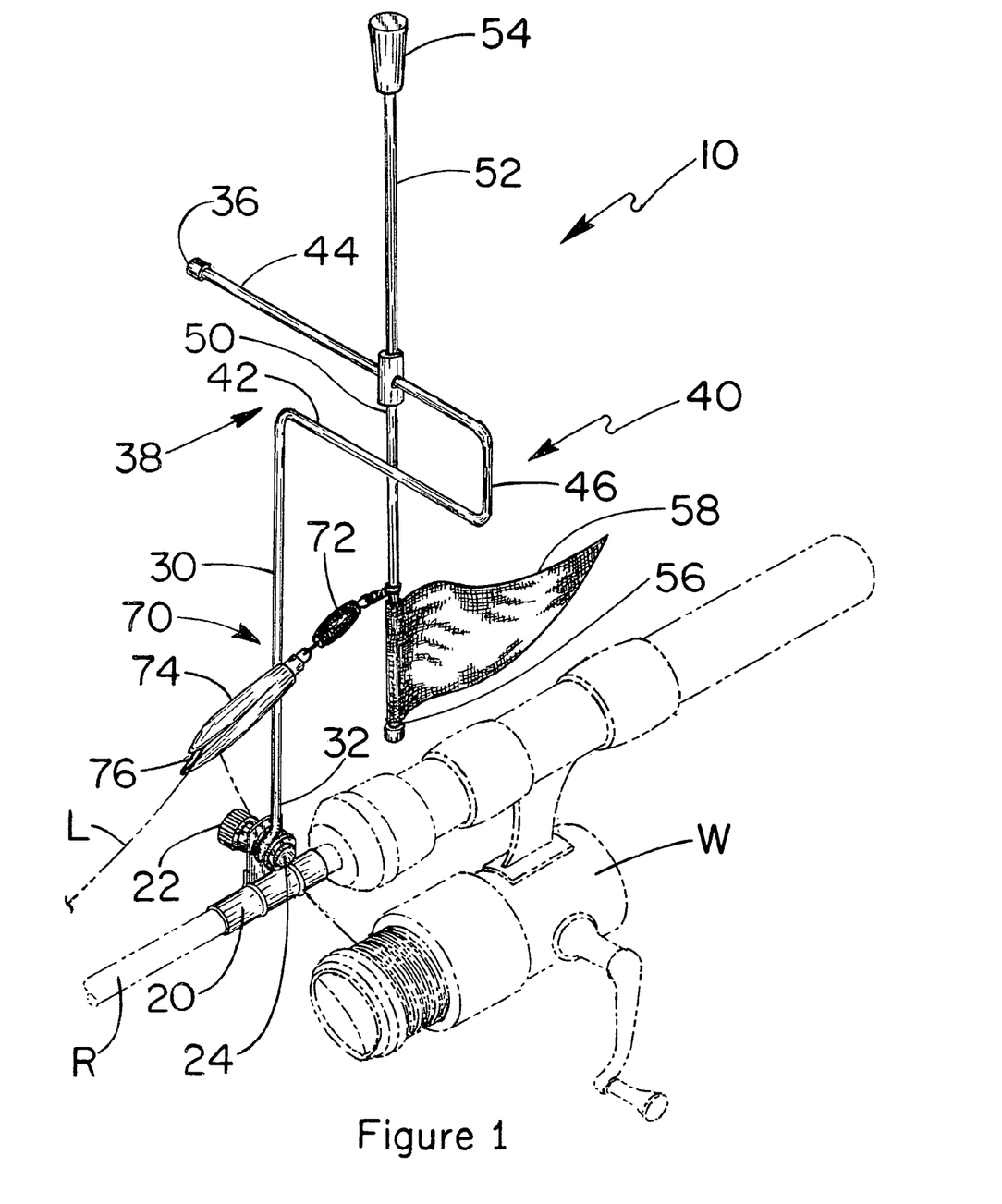
FIG. 1 is a perspective view of the bite-signaling device of the present invention attached to the rod of a rod and reel combination and engaged with the fishing line.
Figure 2:
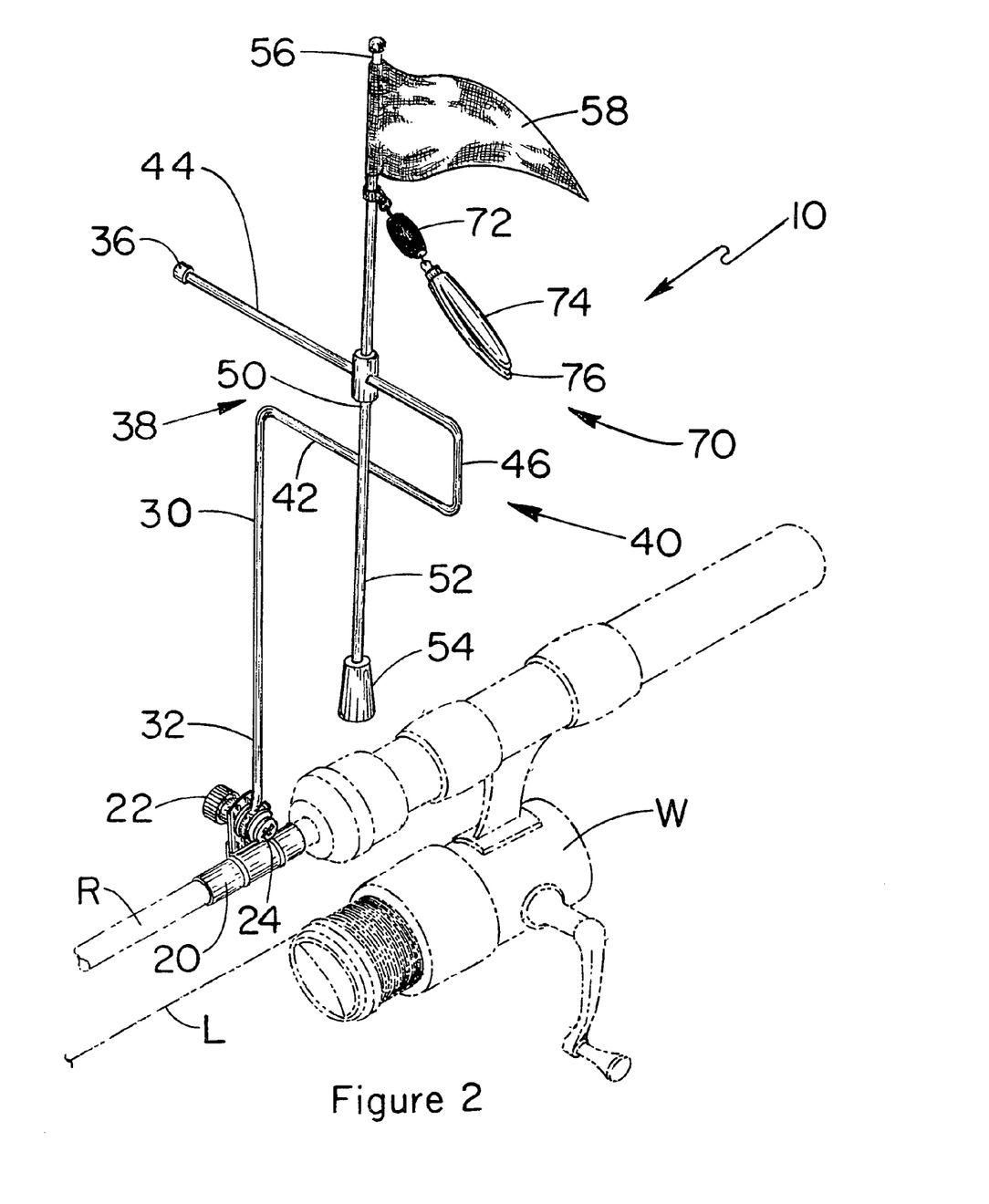
FIG. 2 is a perspective view of the bite-signaling device of the present invention attached to the rod of a rod and reel combination after being disengaged from the fishing line.

Referring now to FIGS. 1-2, a first embodiment of the bite-signaling device 10 is illustrated, attached to the rod R of a rod and reel combination. The bite-signaling device 10 functions equally well with a spinning rod and reel or with a level-wind rod and reel. The embodiment of the invention of FIGS. 1-2 is illustrated attached to a spinning rod and reel combination. The rod and reel combination can be placed in a support device so the fisherman need not hold the fishing rod R at all times. One such support device is marketed as the "Dangler" rod holder and is widely available commercially. Other rod holders may also be employed with comparable results.

Figure 4:
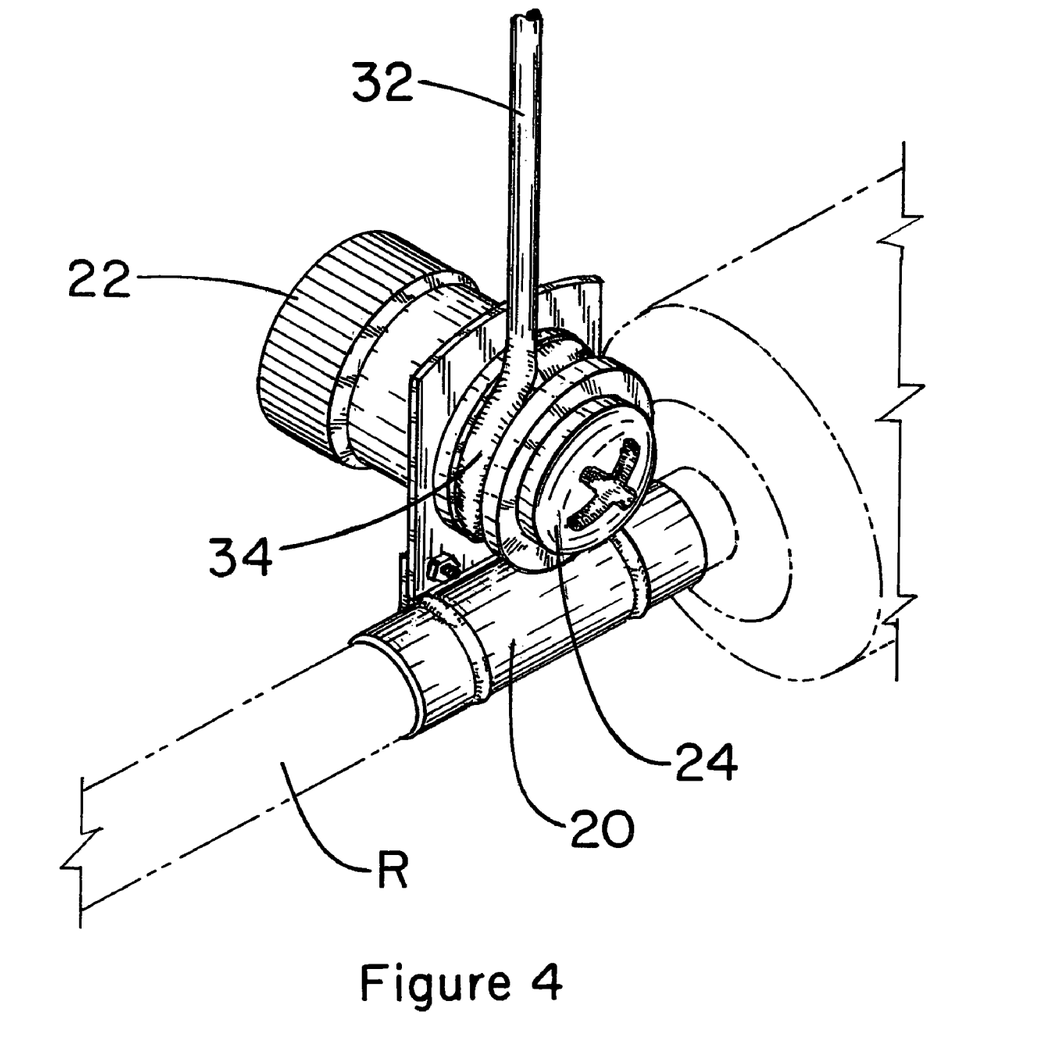
FIG. 4 is an enlarged, perspective view of the clamp member of the present invention secured to a fishing rod and holding the linear support member.

Preferably, the bite-signaling device 10 is secured to the rod R just above the handle to which the reel W is attached. Alternatively, the bite-signaling device 10 can be secured directly to the rod handle. The bite-signaling device 10 includes a clamp member 20 adapted for securing the bite-signaling device 10 to the rod R of the rod and reel combination, shown in greater detail in FIG. 4. A linear support member 30 having a first end 32 and second end 36 is pivotally connected at the first end 32 to the clamp member 20. Preferably, the first end 32 includes a loop or eye 34 with a threaded shaft 24 secured to the clamp member 20, and secured within the loop or eye 34. A knob member 22 is operatively connected to the threaded shaft 24 opposite the clamp member 20, with the knob member 22 rotatable to hold the linear support member 30 in a selected orientation relative to the rod R of the rod and reel combination.

The second end 36 of the linear shaft member 30 has a U-shaped section 40 perpendicular to the linear support member 30. The U-shaped section 40 includes a first leg portion 42 and a second leg portion 44, with a connecting leg portion 46 there between. The first leg portion 42 is attached at an end opposite the connection leg portion 46 to the linear support member 30 and the second leg portion 44 is positioned opposite the linear support member 30.

A linear signal member 50 is rotatably attached at about a midpoint to the second leg portion 44 of the U-shaped section 40 of the linear support member 30. The linear signal member 50 includes a weighted first end 52, having a weight member 54 rigidly secured thereto, and a signaling second end 56. In one embodiment of the invention, the signaling second end 56 includes a flag member 58, for day time use, and in another embodiment, the signaling second end 56 includes a light source 60 for night time use. Most preferably, the light source 60 is inactive in one orientation and active in a second orientation, as described in detail below.

Figure 3:
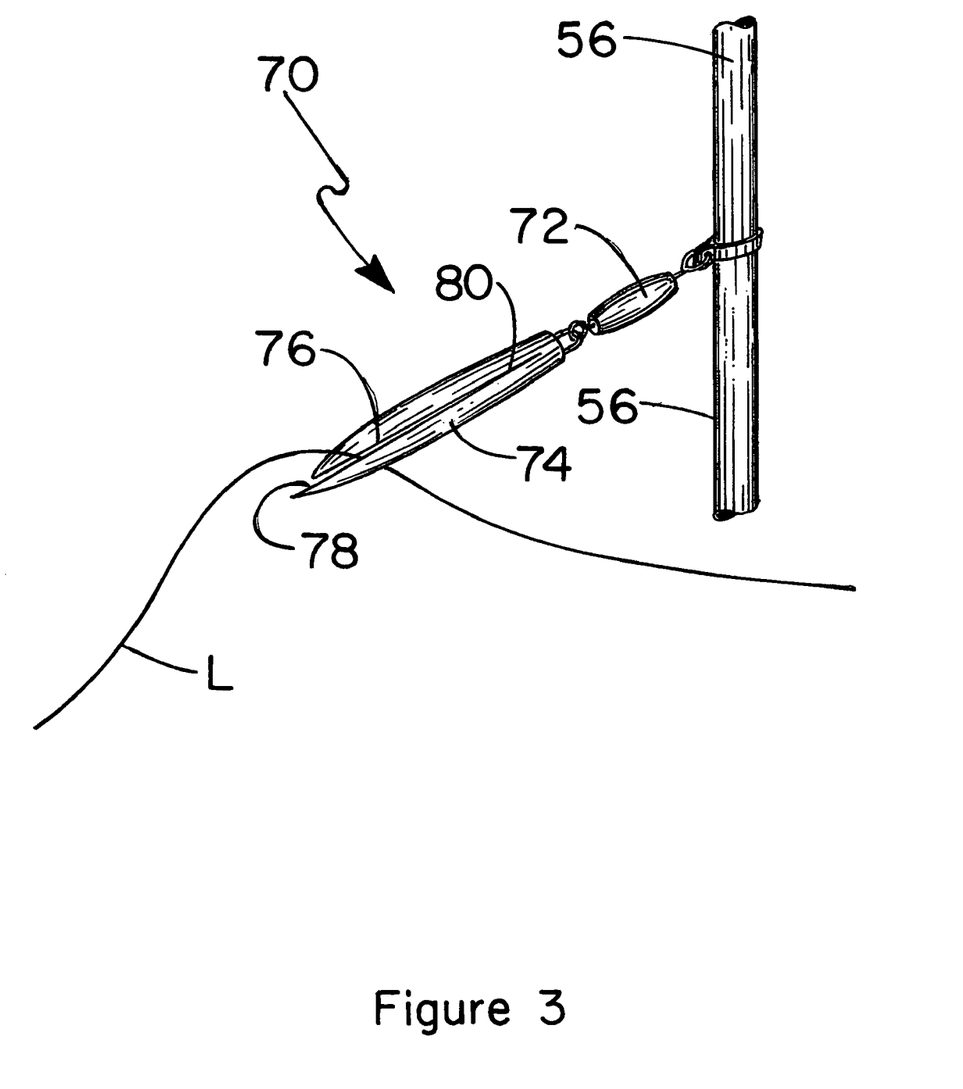
FIG. 3 is an enlarged, perspective view of the line attachment member of the present invention holding a fishing line.

Referring now to FIG. 3, a line attachment member 70 is secured to the signaling second end 56 of the linear signal member 50. The line attachment member 70 is adapted for releasably securing a fishing line L attached to a reel W of the rod and reel combination. Preferably, the line attachment member 70 includes a body section 74 having a closed-end slot 76 with a decreasing width from an open end 78 thereof to a closed end 80 thereof. A swivel device 72 is preferably interposed between the body section 74 of the line attachment member 70 and the signaling second end 56 of the linear signal member 50 to allow rotational movement between the line attachment member 70 and the signaling second end 56 of the linear signal member 50.

With the weighted first end 52 of the linear signal member 50 elevated above the signaling second end 56 thereof, the fishing line L is secured to the line attachment member 70 by gently inserting the fishing line L into the open end 78 of the closed-end slot 70. To facilitate insertion of the fishing line L into the close-end slot 70, the body section 74 on one side of the slot 70 adjacent the open end 70 thereof extends beyond the body section 74 on the opposite side of the slot 70, as illustrated in FIG. 3. Tension on the fishing line L from the reel W, or from the baited end of the fishing line L, maintains the weighted first end 52 of the signal member 50 elevated relative to the signaling second 56 end thereof. When a fish pulls on or strikes at the baited end of the line L, the fishing line L is released from the slot 76 of the line attachment member 70, thereby causing the weighted first end 52 to rotatably descend and elevate the signaling second end 56 of the signal member 50, thereby indicatring to the fisherman that a fish is on the line L. Preferably, the linear support member 30 is oriented at an acute angle relative to the fishing rod R, such that the weighted first end 52 of the signal member 50 is in a non-vertical orientation. Upon release of the fishing line L from the slot 76, the signal member 50 is caused to rotate about the second leg portion 44 of the U-shaped section 40, thereby elevating the signaling second end 56 of the signal member 50. The fisherman can then grasp the rod and reel combination and reel in the fish. The amount of force needed to pull the fishing line L from the slot 76 can be varied by the distance the fishing line L is inserted into the slot 76, which decreases in width toward the closed end 80 thereof. The deeper into the slot 76 the fishing line L is inserted, the greater the force needed to dislodge the fishing line L from the slot 76.

Figure 5:
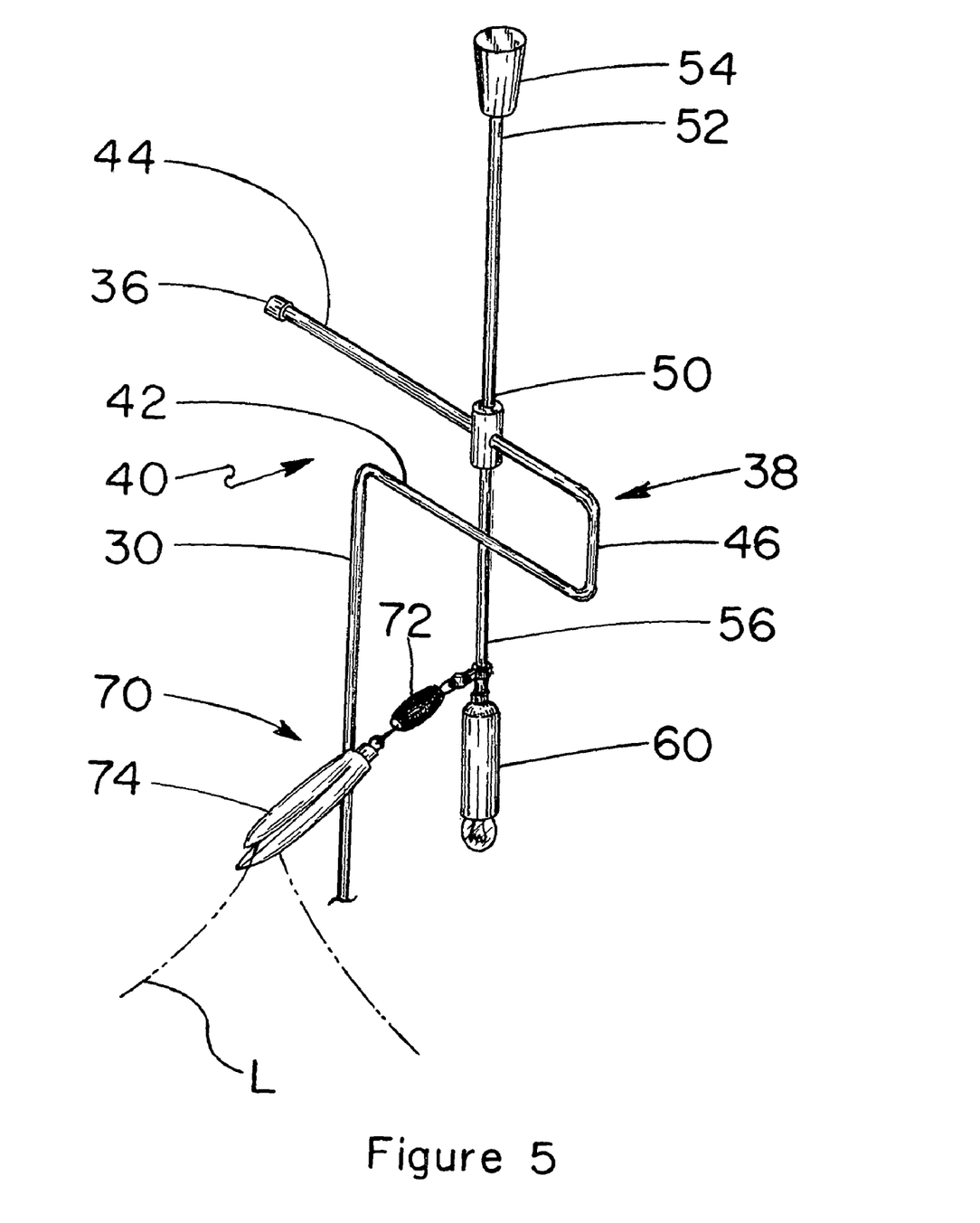
FIG. 5 is a perspective view of an alternative embodiment of the bite-signaling device of the present invention engaged with the fishing line.
Figure 6:
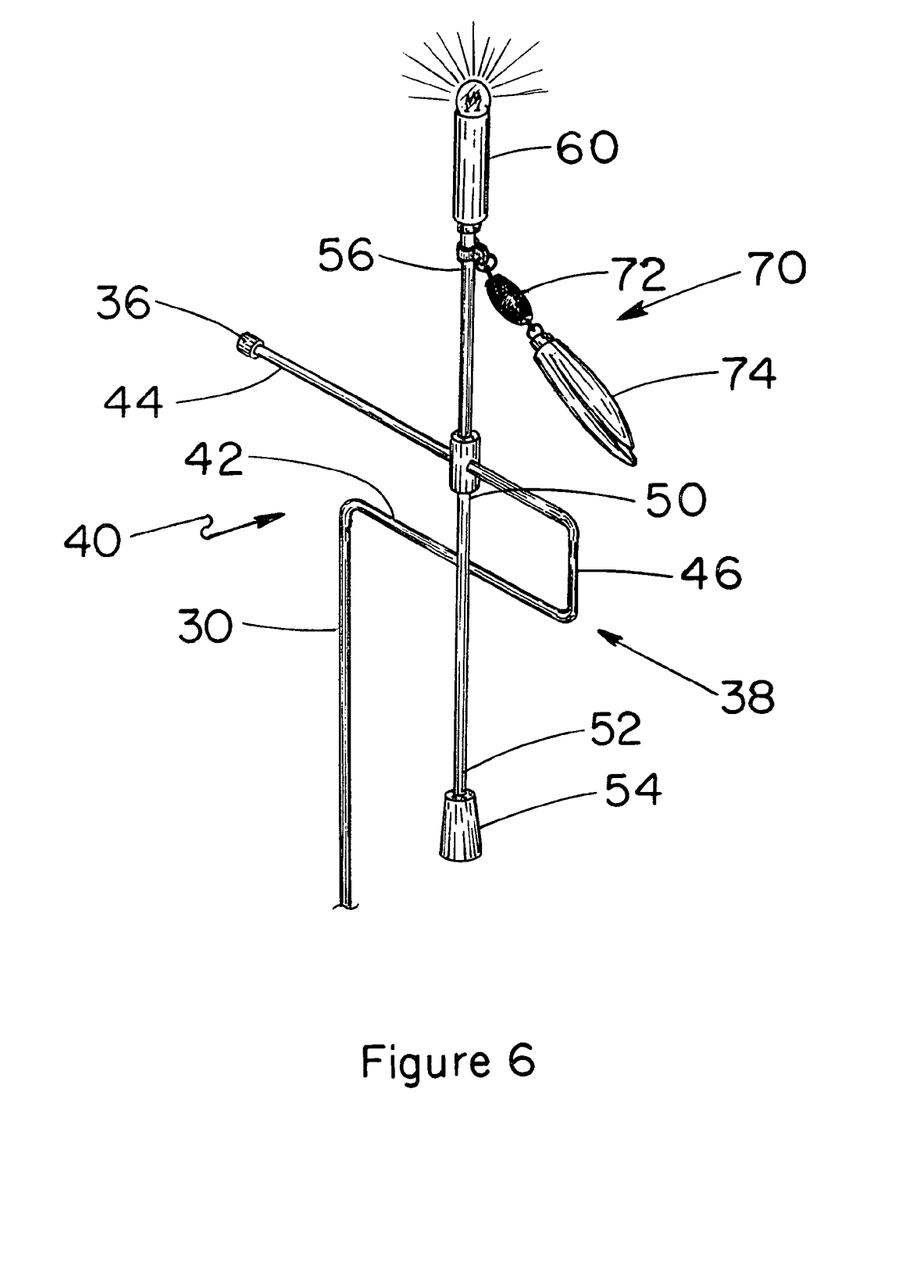
FIG. 6 is a perspective view of an alternative embodiment of the bite-signaling device of the present invention after being disengaged from the fishing line.

As mentioned above, the signaling second end 56 of the signal member 50 can include a light source 60 for night time use. The light source 60 is designed so that in one orientation, downward (FIG. 5), the light source 60 is inactive, and in another orientation, upward (FIG. 6), the light source 60 is active or lighted. Thus, the rotation of the signal member 50 that elevates the signaling second end 56 turns on the light source 60 to indicate a fish bite.

In addition, the pivotal attachment of the linear support member 30 to the clamp member 20 by the threaded shaft 24 and knob member 22 allows the bite-indicating device 10 to be stored tightly against the rod R when not in use. Likewise, the pivotal attachment provides an infinitely variable orientation between the linear support member 30 and the rod R, which the user can tailor to their particular likes and needs.

While the invention has been particularly shown and described with reference to preferred embodiments thereof, it will be understood by those skilled in the art that various changes in form and details may be made therein without departing from the spirit and scope of the invention.

I claim:

1. A bite-signaling device adapted for attachment to a rod of a rod and reel combination, the bite-signaling device comprising:
 a clamp member adapted for securing the bite-signaling device to the rod of the rod and reel combination;
 a linear support member having first and second ends, the first end pivotally connected to the clamp member, the second end having a U-shaped section perpendicular to the linear support member, the U-shaped section including first and second leg portions, the first leg portion attached at an end thereof to the linear support member and the second leg portion opposite the linear support member;
 a knob member operatively connected to the clamp member, the knob member rotatable to hold the linear support member in a selected orientation relative to the rod of the rod and reel combination;
 a linear signal member rotatably attached at about a midpoint thereof to the second leg portion of the U-shaped section of the linear support member, the linear signal member including a weighted first end with a weight rigidly attached thereto and a signaling second end opposite the weighted first end; and
 a line attachment member secured directly to the signaling second end of the linear signal member, the line attachment member including a closed-end slot having a width decreasing from an open end to a closed end thereof, the line attachment member adapted for releasably securing a fishing line attached to a reel of the rod and reel combination;
 whereby the fishing line secured to the line attachment member maintains the weighted first end of the signal member elevated relative to the signaling second end thereof, and releasing the fishing line from the line attachment member causes the weighted first end to rotatably descend and elevate the signaling second end of the signal member.

2. The bite-signaling device of claim 1, wherein the signaling second end of the signal member includes a flag.

3. The bite-signaling device of claim 1, wherein the line attachment member includes a swivel device positioned between the second end of the linear signal member and the line attachment member.

* * * * *